(12) United States Patent
Lipton et al.

(10) Patent No.: US 7,184,002 B2
(45) Date of Patent: Feb. 27, 2007

(54) ABOVE-AND-BELOW STEREOSCOPIC FORMAT WITH SIGNIFIER

(75) Inventors: Lenny Lipton, Greenbrae, CA (US); Jeffrey James Halnon, Richmond, CA (US)

(73) Assignee: StereoGraphics Corporation, Beverly Hills, CA (US)

( * ) Notice: Subject to any disclaimer, the term of this patent is extended or adjusted under 35 U.S.C. 154(b) by 528 days.

(21) Appl. No.: 10/112,423

(22) Filed: Mar. 29, 2002

(65) Prior Publication Data

US 2003/0007070 A1    Jan. 9, 2003

(51) Int. Cl.
G09G 5/00 (2006.01)
H04N 15/00 (2006.01)

(52) U.S. Cl. .......................................... 345/6; 348/55

(58) Field of Classification Search ................ 345/6–9; 348/42–60
See application file for complete search history.

(56) References Cited

U.S. PATENT DOCUMENTS 5,245,319 A * 9/1993 Kilian ............................ 345/9
5,572,250 A * 11/1996 Lipton et al. ................. 348/43
6,477,267 B1 * 11/2002 Richards ..................... 382/154

* cited by examiner

*Primary Examiner*—Alexander Eisen
(74) *Attorney, Agent, or Firm*—Smyrski Law Group, A P. C

(57) ABSTRACT

A video code is embedded into the active video area of a stereo subfield. The video code is detected using an electronic circuit and used to maintain synchrony of the selection device with perspective images. Preferably, the video code is a predetermined sequence of colors.

18 Claims, 6 Drawing Sheets

ABOVE-AND-BELOW STEREOSCOPIC FORMAT WITH SIGNIFIER

TECHNICAL FIELD

The present invention relates generally to the formatting of images for stereoscopic viewing, and more particularly, to an electronic method for providing and detecting a stereoscopic signifier within the video content.

BACKGROUND OF THE INVENTION

The above-and-below format (also known as the over-and-under format), as taught in U.S. Pat. No. 4,523,226 to Lipton et al., has become the basis for a number of stereoscopic software applications and hardware embodiments. The simplicity of the format and its universality with regard to computers and video accelerator boards makes it an outstanding choice for a stereoscopic format. With reference to FIG. 2 (to be discussed more fully below), we divide the image into two portions (subfields): one above (203) and the other below (207), separated by an added horizontal blanking area (205). With this arrangement, we can create an image disposition in which spatial juxtaposition at the normal field rate can be transformed into temporal juxtaposition at twice the field rate by the introduction of a synchronization pulse midway between the top and bottom of the field within the added blanking area.

In the above-and-below format, we create two subfields. (Whether the left image is on the top or the right is on the top is arbitrary, and of no significance in this discussion.) The above-and-below format uses these subfields to incorporate left and right images, in other words, a stereo pair. The subfield blanking interval is created between the subfields, and it is into this subfield blanking interval that a synchronization pulse is added. Therefore, the software developer or content provider need only produce images that are above and below each other, separated by this artificial, or added, subfield vertical blanking area or interval.

The images are squeezed in the vertical anamorphically by a factor of approximately two. We say "approximately two" because a certain number of lines are taken up in housekeeping, namely, in the subfield blanking area, so the number is not exactly two, but it is a close enough approximation. Once we have a properly formatted subfield image as described here, we can add a subfield vertical blanking pulse by some means located between the computer and the monitor.

This means can count video lines or in some way tell the distance between the top and the bottom of the field, in order to properly time the injection of a synchronization pulse into the vertical blanking subfield. Once the added pulse reaches the monitor, the monitor looks at the pulse and triggers the monitor's refresh based on the added vertical blanking pulses. This added pulse alternates with the original vertical blanking pulse. Thus, as mentioned above and will be discussed below, the monitor runs at twice the usual refresh rate. Let us say the video board is running at 60 fields per second. With the added pulse, the monitor will run at 120 fields per second. It must pay attention to the added vertical blanking pulses as well as the original vertical blanking pulses. The reader can now understand the reason for anamorphically compressing the image by a factor of two. This compression will become decompressed when running full-screen images on the monitor, and the normal proportions of the images will be restored.

The major virtue of the above-and-below format is that it is video-accelerator-board independent. It requires no additional software driver support of any kind, as required by other systems, to make the video board work at a high field rate in the stereoscopic mode. The high field rate is a requirement for flicker-free imaging. Each eye must see the same number of images it had seen in the planar mode, or about sixty fields per second.

The above-and-below format also intrinsically indexes or tags the left and right fields with regard to perspective content, which is important since the viewer must see a stereoscopic rather than a pseudostereoscopic image. A pseudostereoscopic image is one in which the left eye sees the right image and vice versa.

The format intrinsically accomplishes distinguishing between left and right image perspectives by employing a standard, for example, by always placing the left image in the top subfield. In this way, we are able to tell that the subfield which immediately follows an original vertical blanking pulse (and not the added pulse) is tagged as the left image.

Above-and-below format images are observed with individual selection devices, as is typically the case for planostereoscopic displays. These selection devices may be of the active type, such as CrystalEyes® or StereoEyes™ wireless eyewear that use an infrared communications link to establish synchronization of the eyewear's liquid crystal shutters with the writing of the subfields. Such a link consists of an infrared emitter, usually located at or near the monitor, and a receiver located within the eyewear. The shutters in the eyewear open and close out of phase with each other but in synchrony with the original or added sync pulses. Additionally, wired eyewear may be used, the eyewear receiving power by some means other than internal batteries.

Another means for viewing the above and below planostereoscopic images is a passive selection device using polarizing eyewear. In this case, a liquid crystal modulator is mounted in close proximity to the monitor, and it changes the characteristics of polarization in synchrony with the view field rate.

In effect, the above-and-below format is a topological transformation in which, as has been mentioned, a spatial juxtaposition is turned into a temporal juxtaposition by means of adding a synchronization pulse between the subfields. The system works because a cathode-ray-tube monitor pays attention to synchronization pulses in order to write a new field and will intrinsically restore the image to its normal aspect ratio while doubling the field rate. However, it may be necessary to calibrate, by some means, the distance between the subfields' center-to-center distance for a particular graphics card because of inconsistencies in the way graphics cards manage the inactive lines within the vertical blanking interval. There is no standard duration for a vertical blanking interval for computers, as there is, by contrast, for television. This is a disadvantage of the present above-and-below system.

A particular graphics card may support a number of different display resolutions (for example, 640×480, 1024×768, and 1280×1024). For a particular resolution, there may be a number of valid vertical refresh rates (for example, 60 Hz, 72 Hz, and 85 Hz). Even with the same resolution and refresh rate, the graphics card may have a number of "modes" whereby the graphics card will mimic the exact timing of a number of other devices or industry standards. While the active or visible display area is a constant at, say 640×480, the horizontal, and even more importantly for the purposes of this discussion, the vertical blanking and sync periods will vary. The application software has available to it only the information about the active area; information about the blanking interval is unavailable.

For the above-and-below format to work correctly, the added vertical sync pulse must be applied exactly between the sync pulses generated normally by the graphics card. The application software must then place the left subfield image in the same position relative to the actual vertical sync pulse as the right subfield image is placed relative to the inserted vertical pulse. Without additional information, it is impossible for the application software to determine this location.

Another problem that is associated with the above-and-below format, at least for a mass communications medium, is that in its historical embodiment, the user must flip a switch to add the vertical synchronization pulse between the subfields. In other words, the system will not automatically turn on in stereo. The electronics that add the subfield sync pulse have to be manually instructed to do so, which is not bothersome for the professionals who presently use the format. However, as long as the user must add the subfield blanking vertical synchronization pulse, the usefulness of the system is restricted to professional users, users who will take the care and trouble to actually flip a switch. Therefore to facilitate ease of use, it will be important to use a signifier to automatically sense the presence or lack of a stereo signal and adjust the user's display accordingly.

A field flag detector, similar to this signifier, has been described in U.S. Pat. No. 5,572,250, in which a blue line code or index is added to the bottom of each field. This blue-line coding system is well-suited to identifying the "handedness" of a field, i.e., whether it is a left eye image or a right eye image. Graphics cards used in such a system alternate images, that is to say, the image on the screen is already flipping between left and right views. The purpose of the detector is to relay the status to the selection device (the eyewear). The downside of an erroneous decoding is minimal. If a non-stereo image is misinterpreted as a stereo pair, the user merely takes off the eyewear.

The ramifications of a misinterpreted signifier used in the above-and-below format are much more serious. If a non-stereo image is detected as a stereo pair, and the external sync doubling device adds the additional vertical sync pulse, the image on the screen is unusable. The top and bottom halves of the image are overlaid and look like a photographic double-exposure. For example, it could not be discerned whether a cursor or pointer visible on the screen was in the upper or lower half. In addition, any image located within the vertical subfield blanking interval will, on most monitors, generate a distracting diagonal line during the retrace. For all of these reasons, it is especially important that the signifier be robust and immune to false detection.

In this disclosure, we describe a signifier used in combination with the above-and-below format to provide a unique and a foolproof system which is ideal for video games and similar mass-consumer products.

In addition, the signifier overcomes one of the problems of the format, as described above, namely that a graphics card by graphics card calibration may be necessary to properly center the two subfields. If the subfields are displayed by the monitor in an uncentered mode, then the result will be vertically offset images which will produce vertical screen parallax, which in turn will cause the user's eyes to converge in the vertical direction. Convergence in the vertical direction does not occur when looking at the visual field and is an artifact of improperly setup stereoscopic display systems. The result for the user is eyestrain or fatigue and a general loss of enjoyment of the displayed image.

Our signifier, by properly compensating for each and every graphics card, notwithstanding the particular operating parameters of any display mode or resolution, overcomes this vexing prior art problem. There are some systems presently in use which use a full-frame indexing scheme, and these cannot overcome the vertical misalignment problem described above. However, the signifier (or index) described below, entirely overcomes this problem.

The signals available to the signifier are the red, green and blue analog video and the digital horizontal and vertical synchronization signals. A signifier code can be devised that will be located with the horizontal or vertical blanking periods, but for the important fact that these areas are not available to the application or driver software. It is a rare instance where the hardware allows information to be placed within either blanking period. Thus, the signifier code must appear within the visible area of the screen, since that is the only practical option available. The other alternative, equally formidable, is to change the video "housekeeping" standards to allow for the inclusion of a left/right index or signifier. There is no likelihood of obtaining changes to an industry standard, given that such a change might adversely affect monitor performance.

SUMMARY OF THE INVENTION

A stereoscopic video system includes a graphics controller providing video output to a monitor. A user then observes the stereoscopic content provided to the monitor through a selection device. The video output from the graphics controller is a plurality of video fields each have a top subfield and a bottom subfield with a blanking area between the subfields. The top subfield includes an active video area providing image content of one perspective while the bottom subfield includes an active video area providing image content of another perspective. According to the present invention, a video code is embedded into the active video area of at least one of the subfields. The video code is used to signify the order of the perspective images. The video code is detected using an electronic circuit and then used to maintain the proper synchrony of the selection device with perspective images.

DETAILED DESCRIPTION OF THE INVENTION

Figure 1:
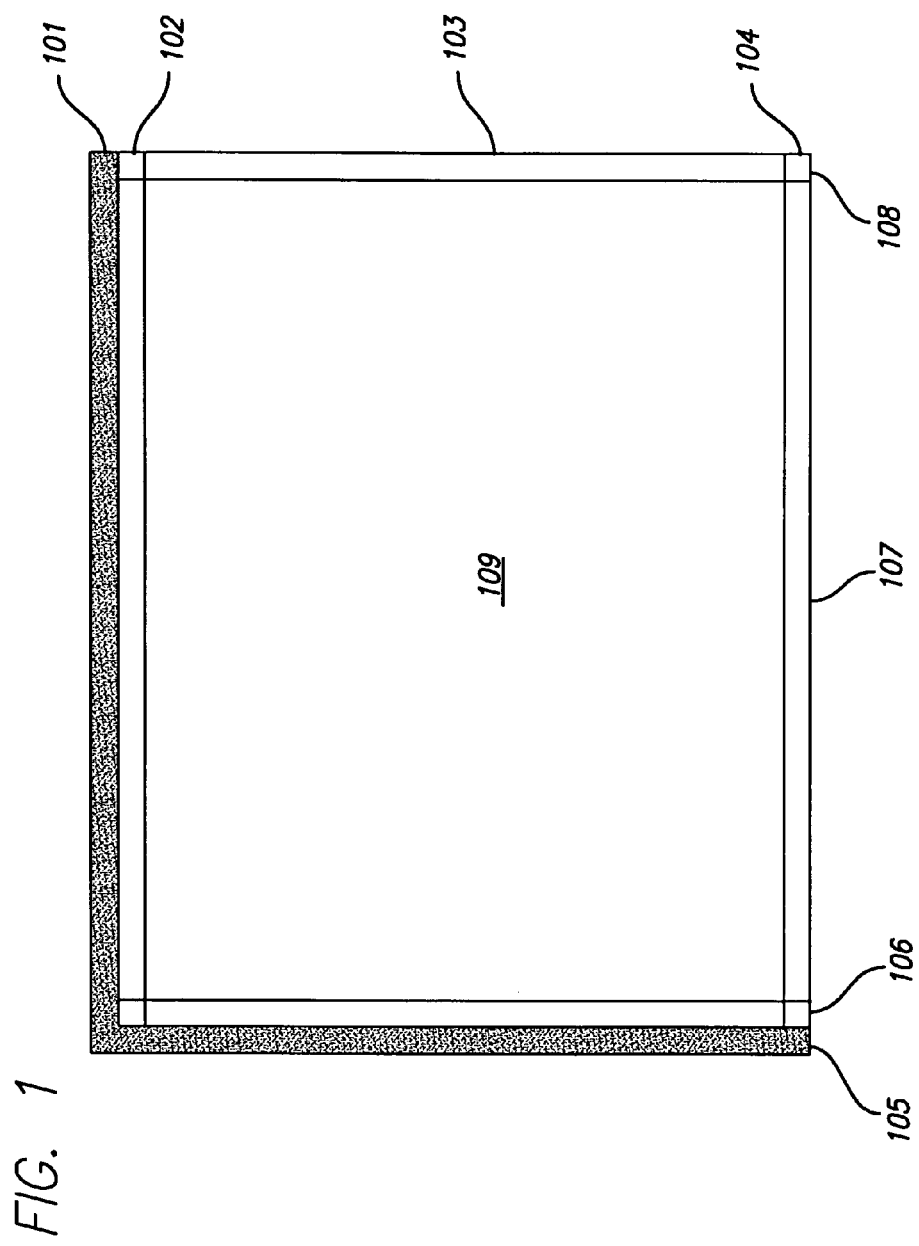
FIG. 1 shows four vertical periods of the output of a graphics card.

FIG. 1 shows four vertical periods of the output of a graphics card. The first portion is the vertical sync period VSYNC (101). The second portion is the vertical front porch VFP (102). VFP is the period after the end of vertical sync but before the vertical display area. The third portion is the vertical display area VDISP (103). The fourth portion is the vertical back porch VBP (104). VBP is the period after the end of vertical display area but before the vertical sync. The total vertical period, whether expressed in terms of time or in number of lines, can be expressed by the following formula:

VTOTAL=VSYNC+VFP+VDISP+VBP

The vertical blanking period, again expressed in terms of time or in number of lines, can be expressed by the following formula:

VBLANK=VSYNC+VFP+VBP

FIG. 1 also shows the equivalent horizontal periods HSYNC (105), HFP (106), HDISP (107), and HBP (108). Similar formulas are:

HTOTAL=HSYNC+HFP+HDISP+HBP

HBLANK=HSYNC+HFP+HBP

Figure 2:
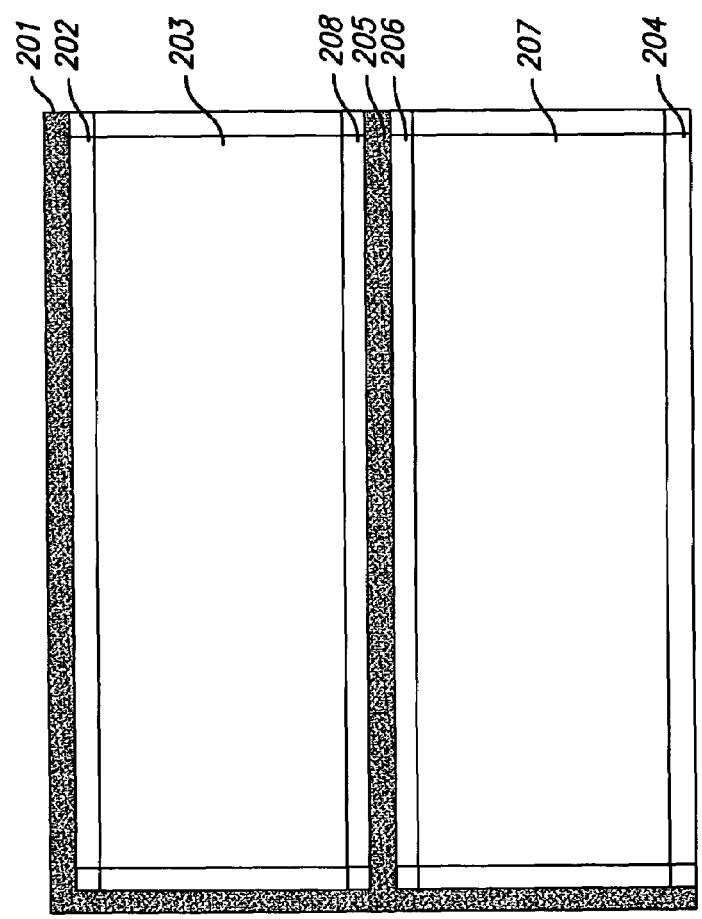
FIG. 2 shows the various periods of an above-and-below formatted image.

FIG. 2 shows the various periods of an above-and-below formatted image. The VSYNC (201), VFP (202), and VBP (203) are the same as in FIG. 1. The left eye image (left sub-field) LDISP (203) (without loss of generality since the designation is arbitrary and it might also be reserved for right image) is shown in the upper portion of the VDISP period. The inserted sync information ISYNC (205) is accompanied by an inserted front and back porch IFP (206) and IBP (208). The right eye image (right subfield) RDISP (207) (without loss of generality since the designation is arbitrary and it might also be reserved for the left image) is shown in the lower portion of the VDISP period. The subfield blanking interval SBI is defined as the sum of the ISYNC, IFP and IBP. In order for the left and right image to appear correctly in terms of center-to-center alignment (to avoid vertical parallax), the following relationships must be maintained:

VSYNC+VFP+LDISP+IBP=ISYNC+IFP+RDISP+VBP for the monitor to remain stable and synchronized;

ISYNC=VSYNC for the monitor to remain stable and synchronized; and

ISYNC+IFP=VSYNC+VFP for the subfield's relative vertical position to be correct so that the left and right images are properly aligned with respect to each other. This must be accomplished to avoid vertical parallax between homologous points. Vertical parallax does not communicate stereoscopic depth information. Its only contribution is discomfort of the observer's eyes as attempts are made to fuse the misaligned images. Convergence of the eyes usually takes place only in the horizontal direction, and vertical convergence of the eye muscles leads to feelings of discomfort and is to be avoided in a stereoscopic display.

Equipment can be designed to provide an enhanced above-and-below capability to a non-stereo-ready computer. This equipment must of necessity be connected between the graphics card video output and the monitor video input in order to control the vertical sync signal and may be connected to other computer ports as well. There are two distinct functions required of the equipment. The first function is the detection of exactly when to insert the additional sync pulse. The second function is the determination of the values of VSYNC, VFP and VBP to ensure proper vertical alignment of the subfields.

In order to know when to insert additional sync pulses, the application program must send a message to the external equipment. There are a number of communications channels possible for this message.

In the event that the equipment uses a connection in addition to the graphics card's video output, this "secondary channel" could be used. Examples of this are a serial port, a parallel port, a keyboard or mouse port, a USB port, or any other available external interface with output capability. The practicality of each of these options varies with the operating system, hardware, user environment, and software requirements, but all are possible.

A drawback of the "secondary channel" method is that it is virtually impossible to use this channel for precise timing. The application program signifies to the equipment that sync insertion is required, but leave it up to the equipment to actually generate the pulse. The equipment must include a phase-locked loop or other timekeeping circuitry to know when, within a microsecond or so, the inserted pulse must occur.

A more practical means for sending the message is to embed it within the subfield blanking interval (SBI). While the name "blanking period" implies that the video must be blank, it is not actually the case. Some monitors impose blanking during the blanking period by gating off the video. Still others leave the video amplifiers active. If the amplifiers are active and there is video input to the monitor, it may, therefore, be displayed. This usually appears as faint diagonal lines that occur while the CRT beam is being retraced to the top of the tube. In either event, video is normally not present during blanking. However, a short message at a well-placed time will not pose a problem.

By using the "embedded" messaging mode, the graphics controller places a short sequence of colored pixels in the video output. The probability of the equipment making an unintentional detection is reduced as the sequence becomes longer, but the longer the sequence, the more visible and potentially obtrusive it will be.

One means of reducing the false detection rate while minimizing the visual impact of the sequence is to require that it be isolated. The blanking period is several lines long. It is appropriate to require that the sequence be preceded and followed by a specified number of completely blank line(s). It can also be required that the sequence be the only video content on its line.

Another method of reducing the error rate is to require that the sequence be located in a specific location, such as at the beginning of a line. In addition, the location of the sequence on the line can be specified for even more reliability.

For the purposes of this function, it is not necessary that the equipment begin inserting pulses immediately upon the first instance of a message. A number of fields can be used to validate and stabilize the system before beginning insertions. Therefore, another method of improving reliability is to require a redundant message. The requirement can be that the message be detected several times in the same field, or that the message be detected for several fields in succession. A variation of this is to require a sequence of different sequences, again either within a field or in successive fields.

It is a reasonable compromise if the location of the message is not restricted to the SBI, and is allowed to be located within (or extended into) the visible area. For example, embedding the code in the first pixel of each line creates a sequence of hundreds of pixels long while remaining nearly invisible.

The entity H3D and others have produced products that receive a message that commands the equipment switch modes, turning on or off the sync insertion circuit. The message remains for a short period (long enough to be detected) and then goes away. Another message is sent when the equipment is to change mode back again to non-stereoscopic operation. This invention is different in that it requires a persistent message that must remain for the equipment to continue inserting sync pulses. In the absence of the message, the equipment defaults to a non-sync doubled mode.

The choice of color is an important factor in reducing the visibility of the message. Blue is the most difficult color for people to detect, while green is the least difficult. Color choices are made accordingly.

Another technique to minimize the visibility of the message is to keep the amplitude or brightness low. It is not necessary to use a completely saturated sub-pixel to be reliably detected. A threshold of about 20% can be used. The lower limit of this threshold is set by a number of factors, including the precision of the detection circuitry, the system noise level, and the signal losses due to cabling and interconnections.

Still another method of minimizing message visibility is to use hysteresis. This requires either multiple detectors, each looking at the same video signal but at a different level, or a single detector but with an adjustable threshold. Both methods perform equally well and making the choice is a function of the method of implementing the circuitry in the equipment.

Figure 3A:
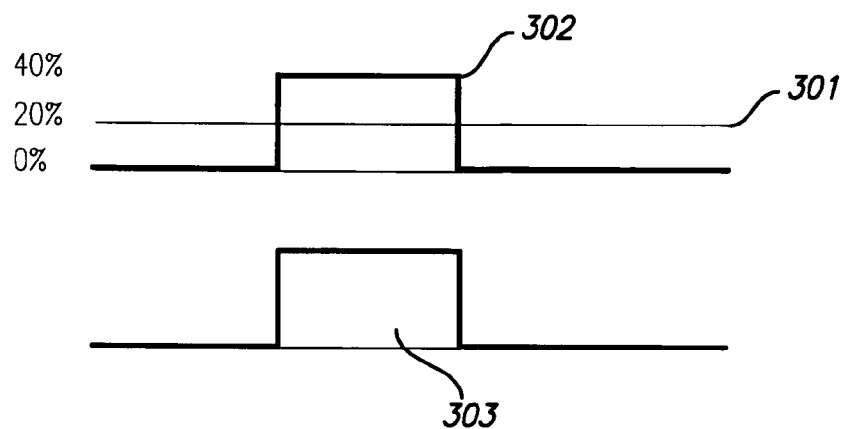
FIGS. 3a and 3b show the difference in visibility of an eight-pixel signal, with and without using hysteresis.
Figure 3B:
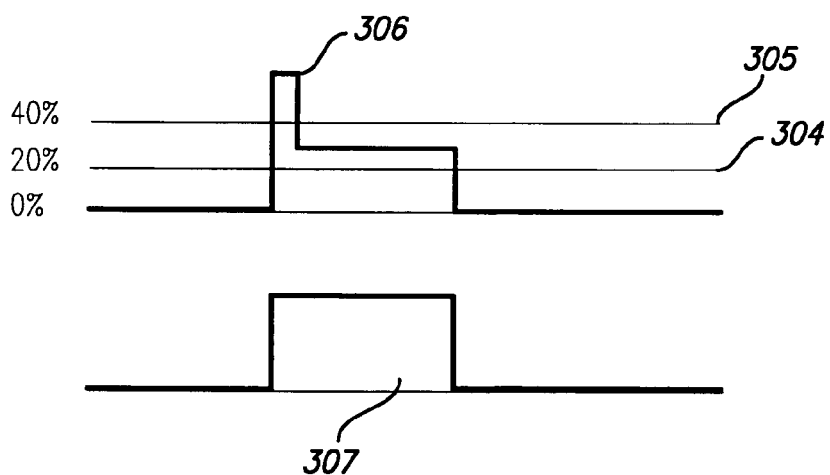

FIGS. 3a and 3b shows the difference in visibility of an eight-pixel signal, with and without using hysteresis. In FIG. 3a, the minimum threshold of 20% is shown as 301, the varying signal is shown as 302, and the region in which the signal exceeds 20% is 303. In FIG. 3b, the same region is shown as 307. Varying signal level 306 crosses the 40% "start" threshold 304 but then drops to just above the "end" threshold 305. At the conclusion of the period, the signal 306 drops below the "end" threshold 305 ending the period 307. If the visibility of a signal is approximated by the integration of the amplitude over a given period, the visibility of the signal in FIG. 3b is approximately 85% of the signal in FIG. 3b. This reduction will vary depending on the thresholds chosen and the time periods.

An issue independent of color and threshold is the encoding method. Numerous examples exist of data being encoded into television-style video. In these cases, the color information is usually not used, only the luminance portion of the signal. These systems have the advantage of having fixed timing: the active area of a full line of NTSC video HDISP always equals exactly 52.7 microseconds. Thus, either a fixed bit period asynchronous RTZ code or a fixed frequency self-clocking code, such as the Manchester Code, can be used.

In this invention, however, the line and pixel times are unknown. Therefore, only a self-clocking code that includes a wide tolerance for timebase variations can be used. This requires that a large portion of each message be used for synchronization information, perhaps many more than the number of bits required to actually carry the message. There is an opportunity available in the present invention that allows the use of all three-color signals in concert to reduce the required length of the message.

One of the three-color signals is used as a clock, while the other two are used as data signals. Two pixels are required to clock in a pair of data bits. Thus, the code averages one pixel per bit. The actual code pattern is somewhat arbitrary, with a few unique choices being less appropriate (such as all ones or all zeros). In general, the more zeros in the code, the less brightness and the less visible.

If it is assumed that the code can contain a substantial number of zeros, it is best to choose blue as the clocking color, since the clock signal is on half the time and off the other half. A stream of alternating blue (the clock) with occasional color spots interspersed within it is a good compromise. Given the lowest practical display resolution of 640 by 480, a code length of 64 pixels is reasonable. This occupies a maximum of 10% of a line.

Figure 4:
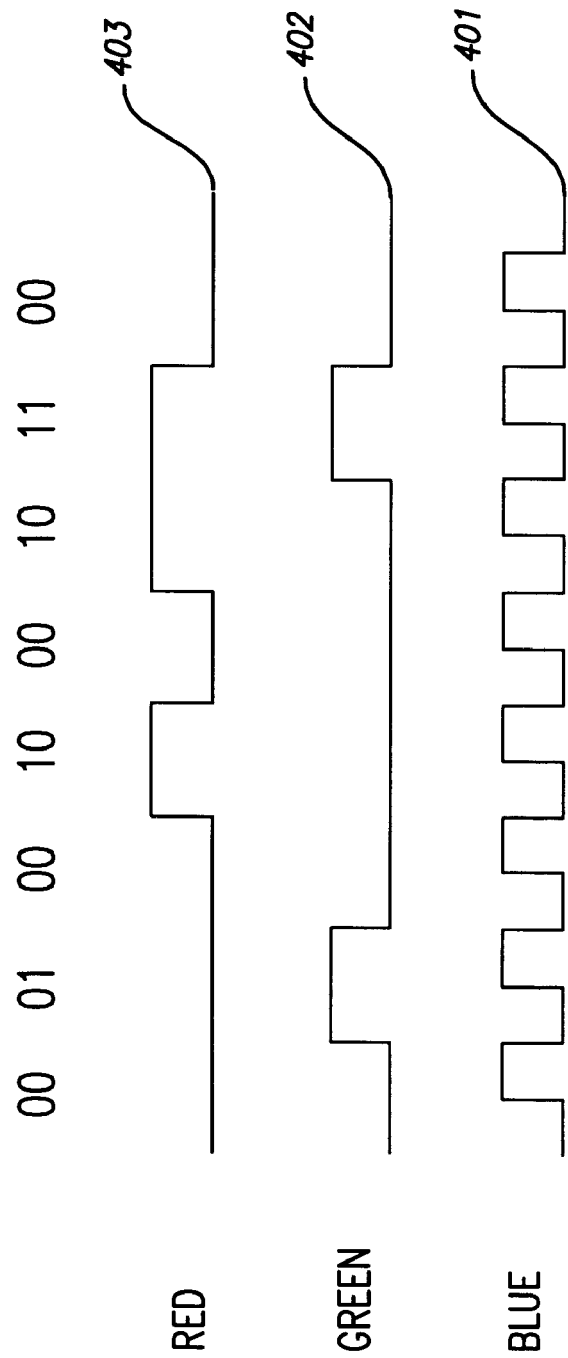
FIG. 4 shows a possible 16-bit pattern for blue, green and red data signals.

FIG. 4 shows a possible 16-bit pattern with the blue as the clock (401), and the green (402) and red (403) as data signals. The pattern is thus 00/01/00/10/00/10/11/00. Note that this code follows the guidelines that minimize visibility. The least visible color (blue) is on the most or half the time. The next most visible color (red) is on three-eighths of the time. The most visible color (green) is on the least or a quarter of the time.

If there is a requirement that the code be placed at a particular location on the screen or line, an important simplification of hardware can be made. The code as described above is the simplest form of self-clocking, and the equipment need not contain any timekeeping circuitry in order to decode the messages. In addition, the placement or location of the code itself can eliminate the remainder of the timekeeping circuitry.

Standard display resolutions generally have an even number of visible lines (i.e., 480, 768, 1024, etc.). When the graphics card generates the blanking interval, the number of lines can be either even or odd, virtually randomly. In the case of an even number of lines in the blanking interval, there is also an even number of total lines. The inserted vertical pulse will be started in coincidence with a horizontal sync pulse, just like the true vertical sync pulse generated by the graphics controller. In the case of an odd number of lines in the blanking interval, there are also an odd number of total lines. The inserted vertical pulse will be started midway between two horizontal sync pulses, creating a 2:1 interlaced display.

The situation is complicated when the display is already interlaced, prior to the insertion of the extra pulse. Since the vertical pulse is already alternating between being coincident with and midway between horizontal pulses, the inserted vertical sync must also be additionally interlaced, creating a 4:1 interlaced display mode.

The location of each series of pulses thus depends on the mode of the graphics controller: progressive scanned or interlaced, even or odd total lines, as shown in Table I.

TABLE I

| Mode | Progressive, Even | Progressive, Odd | Interlaced |
|---|---|---|---|
| 1st VSYNC pulse (generated by graphics controller) | Coincident with HSYNC | Coincident with HSYNC | Coincident with HSYNC |

TABLE I-continued

| Mode | Progressive, Even | Progressive, Odd | Interlaced |
| --- | --- | --- | --- |
| 2nd VSYNC pulse (inserted by equipment) | Coincident with HSYNC | 50% of the way between HSYNC pulses | 25% of the way between HSYNC pulses |
| 3rd VSYNC pulse (generated by graphics controller) | Coincident with HSYNC | Coincident with HSYNC | 50% of the way between HSYNC pulses |
| 4th VSYNC pulse (inserted by equipment) | Coincident with HSYNC | 50% of the way between HSYNC pulses | 75% of the way between HSYNC pulses |

Figure 5:
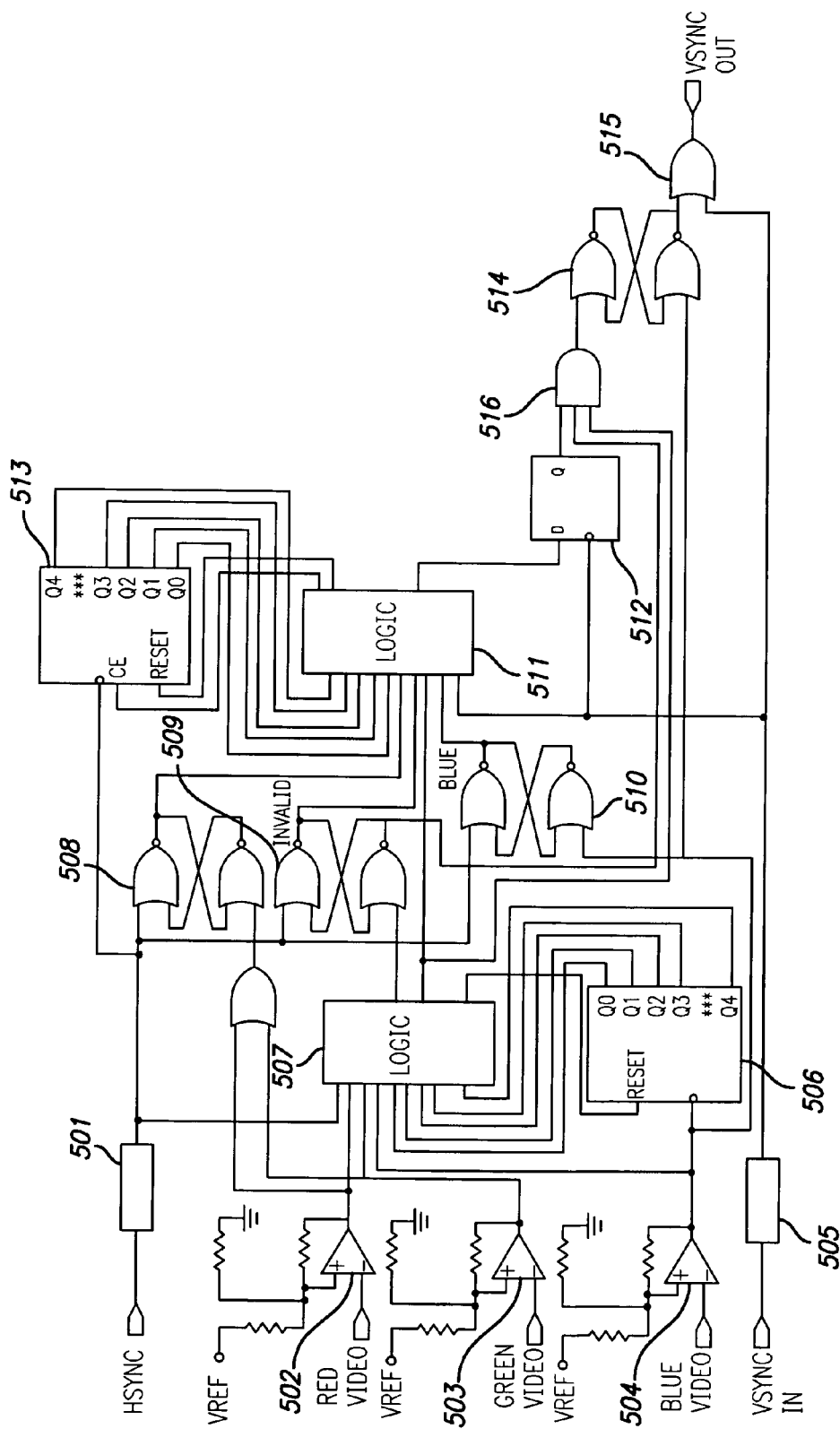
FIG. 5 shows the block diagram of a circuit that implements the functions described above.

FIG. 5 shows the block diagram of a circuit that implements the functions described above. The red, green and blue videos are input to comparators (502), (503) and (504). The choice of VREF and the values of the resistors associated with the comparators determine the triggering thresholds and amount of hysteresis. Input circuit (501) buffers and conditions the HSYNC signal for level and normalizes the polarity (since sync polarity can be either positive or negative, depending on the mode).

Similarly, input circuit (505) processes the VSYNC IN signal. Note that even though it is not shown in the figure, the HSYNC and all three color video signals are allowed to pass through the equipment, passing with as little loading as possible directly from the graphics controller output to the monitor input. Only the VSYNC signal is different from input to output.

The bulk of the circuit is comprised of a pair of state machines, one effectively "nested" inside the other. The inner "code detect" state machine is used to decode a sync doubling command. The output of the blue video comparator (504) is used to clock counter (506), whose outputs Q0 through Qn are input to combinational logic (507). This counter is reset to zero at the end of each line. It waits for a rising edge of the clock color (in this case, blue). If the red and green video signals are the correct values for the first bit-pair of the code, the counter is allowed to count up to the next value. If, however, the red and green video signals are not the correct values for the first bit-pair of the code, the combinational logic will reset the counter, forcing it to continue looking for the correct first bit-pair.

The counter will continue as long as the red and green videos are correct for the particular position in the code sequence. If at any point the video signals are incorrect for that position, the counter will be reset and the state machine will be restarted. If the code is correct throughout the entire sequence, however, the combinational logic will allow the count to progress until its terminal value. A state machine that holds at the terminal count signifies the reception of a valid sync doubling code.

Note that the configuration of the combinational logic and the number of bits in the counter are a function of the length and design of the particular code sequence.

Flip-flop (508) is used as part of the logic to detect a blank line. It is set whenever any red or green video is present. It is cleared at the end of each line. It is used in conjunction with flip-flop (510), which is similarly monitoring the blue video. These signals are input to the outer "mode" state machine, comprised of counters (511) and (513). This state machine is slightly more complicated, including the ability to pause the progression with a count enable (CE) input to the counter. It is reset at the beginning of each frame by the VSYNC IN signal. It looks for a particular sequence of events. First, it waits to see that there are a minimum number of lines that are completely black (neither flip-flop (508) nor (510) are set during the entire line). Next it looks for a "code detect" signal from the code detect state machine in conjunction with the output of flip-flop (509). This is a "code violation" flip-flop. If either before or after the code is detected, there is any video activity that is not part of a valid code, the flip-flop is set and the code detected on that line is invalidated. Finally, it looks for a minimum number of lines that are completely black (neither flip-flop (508) nor (510) are set during the entire line) following the code.

When all three of these conditions have been met (black lines, code detected alone on a line, more black lines), then the state machine output is saved by latch (512) at the leading edge of vertical sync. In subsequent fields if a valid code is detected, it is enabled by gate (516) and latched by flip-flop (514) as soon as the code is detected, whether that be at the end, in the middle, quarter, or three quarters into a line. This is ORed with the original VSYNC IN signal by buffer/gate (515) to create the VSYNC OUT signal to drive the monitor. Note that latch (512) must be latched for each field. If the prescribed sequence of events has been detected, sync doubling will be enabled for the next field. If the code was not detected or there was a violation of the sequence, then a code detected in the next field will not generate an added VSYNC pulse. The first added VSYNC pulse will, therefore, occur only in the second and subsequent fields.

In the same way that the programmer has control over the location of the added VSYNC pulse, the programmer has control over its duration. In this case, all that is necessary to terminate the added VSYNC pulse is activity on the blue video. This will reset flip-flop (514), ending the added VSYNC pulse.

Note that the flip-flops and state machines shown in FIG. 5 are one possible implementation. A more traditional method of detecting a code sequence is to use a shift register to capture the bit sequence and then use a parallel comparator to determine if the desired code has been received. This method is more straightforward to design and is equally able to process any arbitrary code. The method shown in FIG. 5 is more difficult to design and may be difficult to implement for some codes, but a careful choice of code will use a small fraction of the hardware resources (flip-flops and gates).

Another implementation can be done using an embedded microcomputer. The video-speed functions of the inner state machine are difficult for an MPU to perform. The cost, power and size of an MPU capable of operating at the speed required for high-resolution displays may make it a less desirable choice than that of FIG. 5. However, an MPU is a practical substitute for the outer state machine, especially if additional functions are required.

An example of an additional function is the counting of the number of lines in each portion of the vertical blanking interval. In order for the invention of FIG. 5 to work correctly, it is necessary that the application programmer know where to place the sync doubling command code and where to locate the second (right) subfield. These can be determined practically only with the participation of the user or by the use of a sensing circuit.

If the user is asked to participate, the programmer can place a special test pattern image on the screen. The programmer then takes an educated guess (based solely on the resolution of the screen) on the location and duration of the sync doubling command. Through the use of mouse clicks, keystrokes, or the like, the program can be guided to improvements in the alignment. This is an iterative process and may result in unstable displays that are hard to reconcile by the observer.

Figure 6:
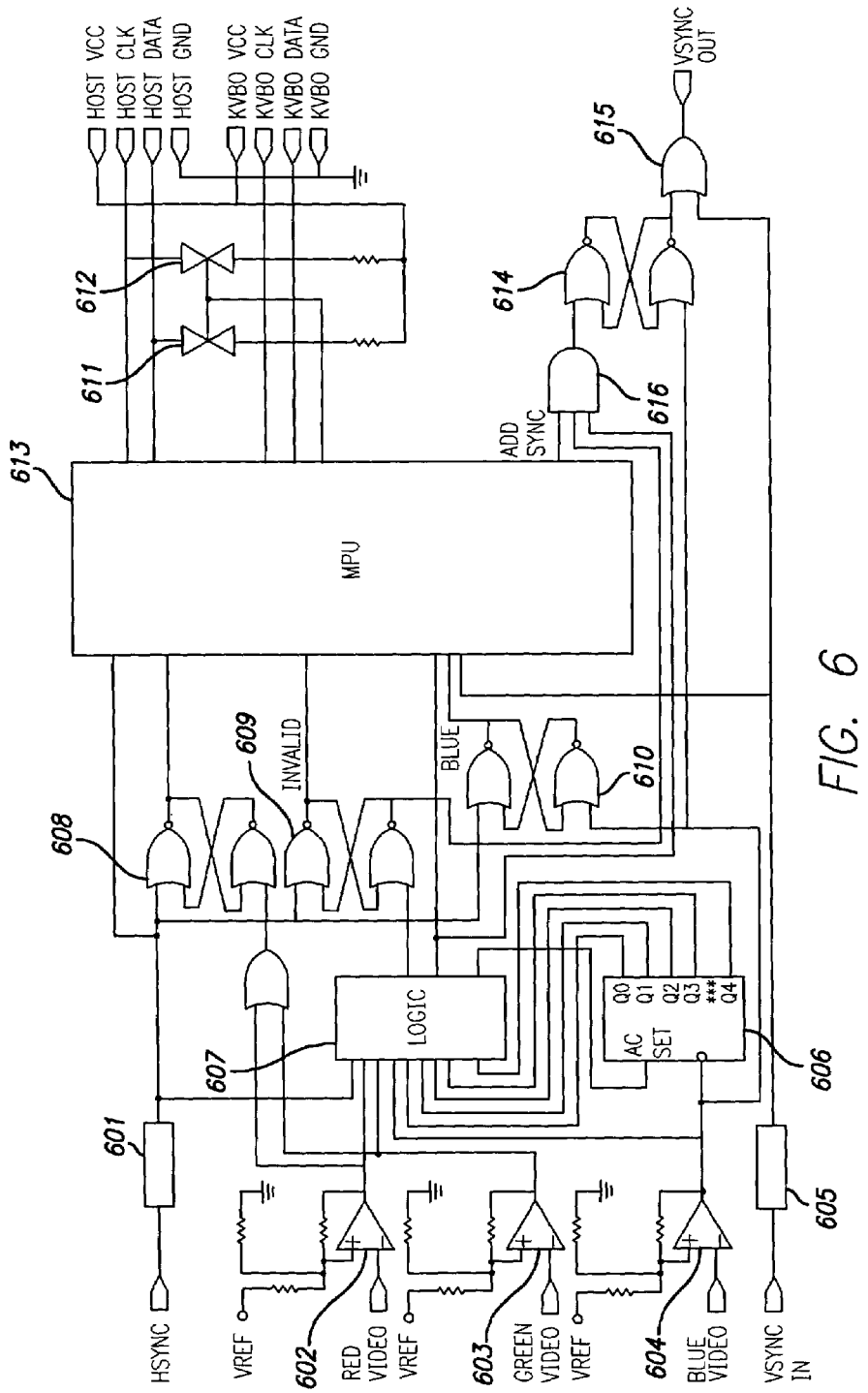
FIG. 6 shows a circuit improving upon that shown in FIG. 5 because it requires no user intervention.

A much better approach is to automate the process. If a circuit, such as is shown in FIG. 6, is employed, this information can be determined and fed back to the application program, requiring no user intervention.

Much of this design is the same as in FIG. 5: the comparators (602), (603), and (604); the HSYNC and VSYNC IN buffers (601) and (605); the inner state machine counter (606) and combinational logic (607); the red/green, code violation, blue, and code detect flip-flops (608, (609, (610), and (614); and the VSYNC OUT gate and buffer/gate (616) and (615).

Changed circuitry consists of microcomputer (613). This takes the place of the state machine (511) and (513), as well as latch (512). The programming of the MPU creates an output signal ADD_SYNC that, when ANDed with the code detect flip-flop, creates the inserted VSYNC pulse.

New circuitry is added in the form of isolation switches (611) and (612) with their passive pull-up resistors. These devices allow the MPT to interrupt the signal from the keyboard to the host and to insert data.

The important new function of the MPU is to count the lines within the vertical blanking interval. Instead of having a single code that the inner state machine is able to detect, a pair of codes can be defined which the same state machine can easily detect. One code is the "Add Sync" command as has already been described. The other is a "Report Blanking Interval" command. In this case, the application program places the "Report Blanking Interval" command somewhere in the frame and makes sure that at least the first and last line have some video content. When the MPU receives the "Report Blanking Interval" command, it begins by counting the number of lines of black between the end of active video and VSYNC IN (the front porch), the number of lines that VSYNC IN was active, the number of lines of black between VSYNC IN and the first line of active video (the back porch), and the interlace status (2:1 interlace or progressive scan). The MPU then uses the keyboard interface to send a message, in the form of a number of keycodes, to the application program. Once the application knows the details of the blanking interval, the position of the "Add Sync" command can be easily calculated.

Note that an MPU is not required for this additional capability, but is merely one practical means to implement the required functions. Also note that the keyboard interface is not the only appropriate communication channel between the equipment and the host computer. A serial port, parallel port, USB port, or other interface could alternately be used for this purpose.

We have disclosed an improvement to the above-and-below format, the essence of which is to signify the presence of subfields, hence stereoscopic content, continuously when that content is present. In this way, we allow for the display to switch between stereoscopic and planar modes without user intervention. We describe several means for accomplishing this end, but others versed in the art may have little difficulty in making minor variations to our teachings to accomplish the same purpose. Further, we have revealed means to ensure that there is proper vertical alignment between subfields. Although particular means are described for accomplishing this important goal, others may be able to apply our basic teachings in variations that do not substantially depart from what they have learned herein.

The invention claimed is:

1. A stereoscopic video system having a graphics controller providing video output to a monitor and a user observing the monitor through a selection device, wherein the video output is a plurality of video fields each having a top sub field and a bottom sub field with a blanking area therebetween, and wherein the top sub field includes a first active video area providing image content of one perspective and the bottom subfield includes a second active video area providing image content of another perspective, and wherein the blanking area provides a sync pulse to refresh the monitor, the improvement comprising:
   embedding a video code into the active video area of at least one of the plurality of sub fields, wherein the video code is configured to identify pending transmission of additional sync pulses;
   electronically detecting the video code; and
   controlling the selection device based on the video code detection.

2. A stereoscopic video system as in claim 1, wherein the video code is a predetermined sequence of colors inserted on at least one line of the active video area.

3. A stereoscopic video system as in claim 2, wherein the video code is isolated in the active video area.

4. A stereoscopic video system as in claim 2, wherein the sequence is the only video content on the line.

5. A stereoscopic video system as in claim 2, wherein the sequence is located in a predetermined location on the line.

6. A stereoscopic video system as in claim 5, wherein the sequence is located in the beginning of the line.

7. A stereoscopic video system as in claim 2, wherein a preset number of blank lines precedes the line containing the sequence.

8. A stereoscopic video system as in claim 2, wherein a preset number of blank lines follows the line containing the sequence.

9. A stereoscopic video system as in claim 2, wherein the sequence is repeated on more than one line of the video area.

10. A stereoscopic video system as in claim 1, comprising embedding the video code redundantly into the active video area of a sub field.

11. A stereoscopic video system as in claim 1, comprising embedding the video code redundantly into the active video area of successive subfields.

12. A stereoscopic video system as in claim 1, wherein the video code is a plurality of predetermined sequences of colors inserted on at least one line of the active video area.

13. A stereoscopic video system as in claim 2, wherein the predetermined sequence includes one color as a clock pulse and additional colors as data pulses.

14. A stereoscopic video system as in claim 13, wherein the sequence is an alternating stream of blue pixels acting as the clock pulse with occasional other color spots.

15. A stereoscopic video system wherein a user observes a monitor through a selection device, comprising:
   a graphics controller providing video output to the monitor in the form of video fields each having a top sub field and a bottom sub field with a blanking area therebetween, wherein the top sub field includes a top active video area written with image content of one perspective and the bottom subfield includes a bottom active video area written with image content of another perspective, and wherein the blanking area is written with a first sync pulse to drive a refresh of the monitor, and wherein the video code is written into the active video area of at least one sub field, said video code configured to identify pending transmission of additional sync pulses; and an electronic circuit coupled to detect the video code in the video output and then initiate insertion of a second sync pulse at a location in one video field.

16. A stereoscopic video system as in claim 15, wherein the video code is a predetermined sequence of colors inserted on at least one line of the active video area.

17. A stereoscopic video system, comprising:

a graphics controller providing video output in the form of video fields each having a top sub field and a bottom sub field with a blanking area therebetween, wherein the top sub field includes a top active video area written with image content of one perspective and the bottom subfield includes a bottom active video area written with image content of another perspective, and wherein video code is written into the active video area of at least one sub field, said video code configured to identify pending transmission of sync pulses; and an electronic circuit configured to detect the video code in the video output and insert a sync pulse in one video field.

18. A stereoscopic video system as in claim 17, wherein the video code is a predetermined sequence of colors inserted on at least one line of the active video area.

* * * * *